United States Patent [19]

Baker

[11] Patent Number: 4,869,202

[45] Date of Patent: Sep. 26, 1989

[54] SOLDER DIP FIXTURE

[76] Inventor: Jess J. Baker, 405 Talbert St., Simi Valley, Calif. 93065

[21] Appl. No.: 273,284

[22] Filed: Nov. 18, 1988

[51] Int. Cl.⁴ .................... B05C 3/20; B05C 13/02
[52] U.S. Cl. ................................. 118/425; 118/74; 118/503; 134/76; 134/201; 269/903; 228/43
[58] Field of Search .............. 118/500, 425, 503, 74; 269/903, 43, 296; 228/43; 134/76, 201

[56] References Cited

U.S. PATENT DOCUMENTS

| | | | |
|---|---|---|---|
| 766,201 | 8/1904 | Sponsel | 198/409 |
| 2,641,212 | 6/1953 | Meilstrup | 219/9.5 |
| 2,921,550 | 1/1960 | Goodykoontz, Jr. | 269/297 |
| 3,020,880 | 2/1962 | Wallace | 118/503 |
| 3,061,919 | 11/1962 | Tack | 29/241 X |
| 3,088,728 | 5/1963 | Sanborn | 269/40 |
| 3,296,436 | 1/1967 | Schneeman | 378/208 |
| 3,386,156 | 6/1968 | Griesemer et al. | 29/428 |
| 3,502,317 | 3/1970 | Killerby et al. | 269/43 |
| 3,543,668 | 12/1970 | Vlock | 118/500 X |
| 3,681,835 | 8/1972 | Evans et al. | 29/476 X |
| 4,046,362 | 9/1977 | Spillers | 269/43 |
| 4,121,816 | 10/1978 | Eads | 269/296 |
| 4,149,311 | 4/1979 | Benson et al. | 269/903 X |
| 4,300,754 | 11/1981 | Lawrence | 269/8 |
| 4,391,220 | 7/1983 | Kent | 118/425 X |
| 4,489,923 | 12/1984 | Barresi et al. | 269/8 |
| 4,580,523 | 4/1986 | Sunaga et al. | 118/503 |
| 4,614,294 | 9/1986 | Weaver | 118/503 X |
| 4,654,227 | 3/1987 | Cornellier | 118/503 X |
| 4,677,937 | 7/1987 | Tee | 118/500 |

FOREIGN PATENT DOCUMENTS 1596991 1/1971 Fed. Rep. of Germany ...... 134/201

Primary Examiner—Shrive Beck
Assistant Examiner—Alain Bashore
Attorney, Agent, or Firm—Kelly, Bauersfeld & Lowry

[57] ABSTRACT

An improved fixture is provided for use in supporting a plurality of components, particularly such as electrical or electronic components having elongated conductive terminals, during solder dip process steps or the like. The fixture comprises a generally U-shaped frame adapted to support a stacked group of channel members each having a generally U-shaped cross section to include opposed side walls with aligned slots therein. The channel members are assembled on the frame with a plurality of electrical components or the like supported between the channel member side walls and with the component terminals projecting outwardly through the side wall slots. When assembled, the fixture can be oriented as required to dip the terminals into a solder or other bath while maintaining the components in spaced relation against immersion into the bath.

18 Claims, 2 Drawing Sheets

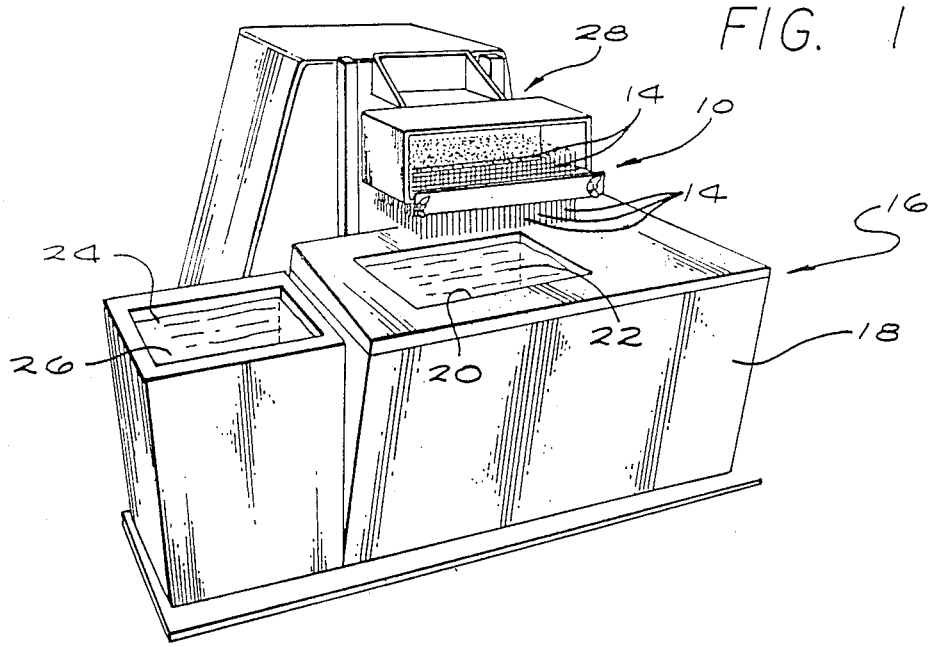
FIG. 1
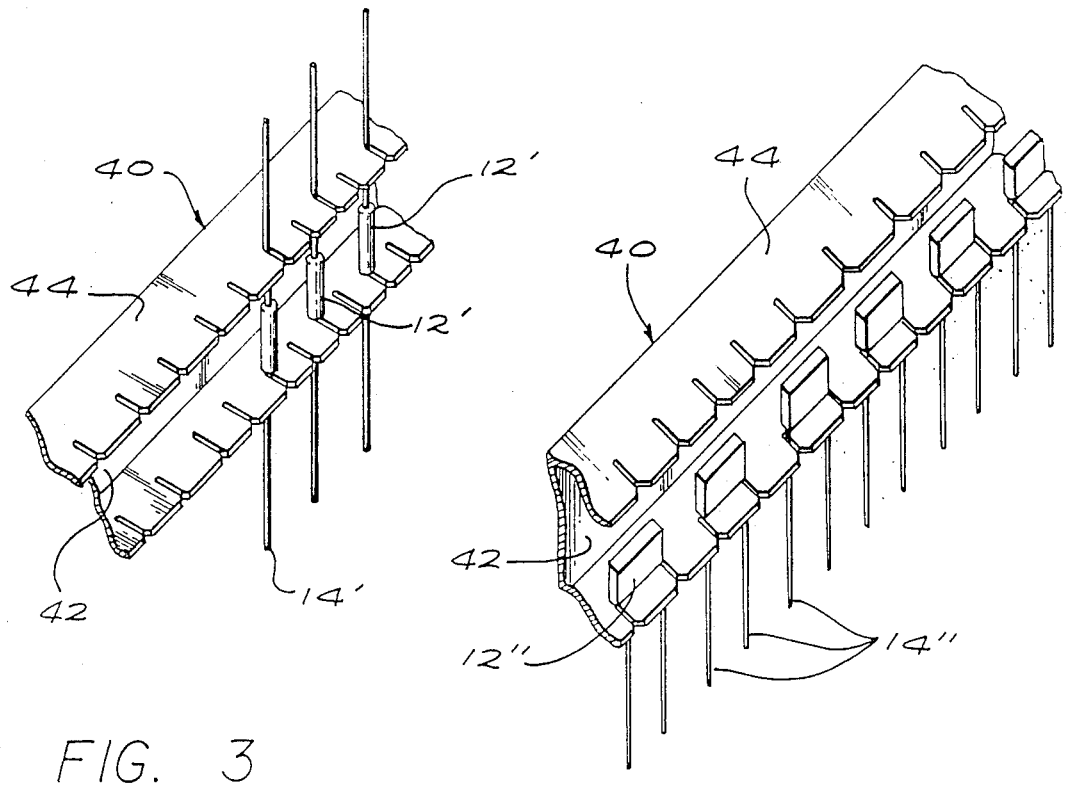
FIG. 3
FIG. 4

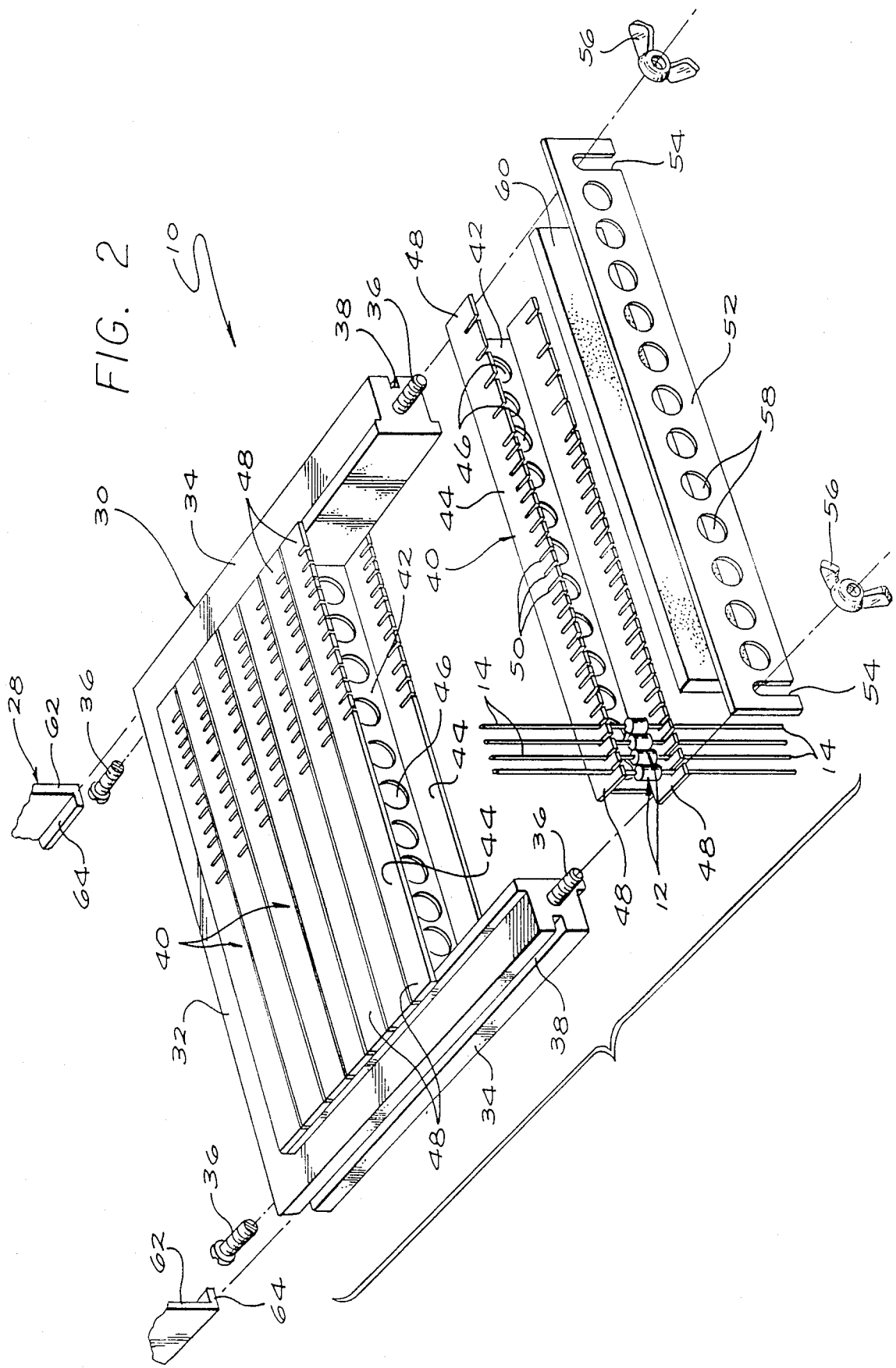

SOLDER DIP FIXTURE

This is a continuation of application Ser. No. 069,820, filed July 6, 1987 now abandoned.

BACKGROUND OF THE INVENTION

This invention relates generally to apparatus for handling small production parts during processing steps particularly such as soldering and plating steps and the like. More specifically, this invention relates to an improved fixture for supporting a plurality of small components such as electrical parts during solder dip coating of conductive terminals thereon.

Modern electrical and electronic components such as resistors, transistors, and other solid state components are manufactured typically in the form of a relatively small component body with one or more outwardly projecting terminals. For many of these components, it is desirable to apply a metallic solder coating to the terminals for facilitating subsequent assembly into the appropriate circuit or system. However, application of a solder coating to the relatively small terminals of electrical components which are also relatively small in size can be a time consuming and tedious process requiring a high degree of manual labor.

For example, solder coating of the conductive terminals can be performed by manually holding each component while the terminal or terminals thereof are dipped into a heated bath of appropriate solder material, with the solder dip step typically being preceded by rinsing the terminals in a suitable solvent. This manual approach, however, is extremely labor intensive and thus undesirably increases the production cost of the manufactured components. Alternate approaches have envisioned the use of component jigs or fixtures designed to hold a group of components during a solder dip step. However, to date, these fixtures have been designed for use with components of a particular size or shape, whereby it has been necessary for several different fixtures to be obtained and used when components of different sizes and shapes are processed. Moreover, while such fixtures advantageously support several components during a single solder dip step, loading of the components into the fixture can be a relatively tedious task requiring considerable manual skill.

There exists, therefore, a need for an improved fixture of the type designed to support a plurality of small parts such as electrical components or the like, wherein the fixture is adapted for rapid and easy loading and for subsequent easy handling during, for example, a solder dip process step or the like. The present invention fulfills these needs and provides further related advantages.

SUMMARY OF THE INVENTION

In accordance with the invention, an improved fixture is provided for supporting a plurality of small components during a solder dip step or the like. The fixture comprises a relatively simple frame adapted to receive and support a stacked plurality of open channel members which are designed in turn to support a plurality of electrical or electronic components or the like during processing.

The fixture frame has a generally U-shaped configuration defined by a pair of generally parallel end posts connected at their lower ends to the opposite ends of an elongated lower support bar. A plurality of channel members are adapted to stack upon the lower support bar in positions extending between the end posts. Each channel member has a generally U-shaped cross section defined by a lower apertured base wall sized to extend between the end posts, and a pair of upstanding side walls with extension flaps at the opposite ends thereof for engaging the outboard sides of the end posts thereby retaining the channel members nested between the end posts. The side walls of each channel member have aligned pairs of slots formed therein.

The channel members are loaded into the frame one at a time to extend between the end posts, and a plurality of electrical or electronic components or the like are placed into each channel member with component terminals projecting outwardly through a selected pair or pairs of the side walls slots. After each channel member is loaded into the frame and loaded with the selected components, a gate strip in connected between the tops of the end posts to retain the channel members and loaded components in place. The fixture is then turned on its side as by loading thereof into a mobile transfer head of a solder dip station for dipping the terminals projecting outwardly from one side thereof into a selected solder bath for coating purposes. With components having a pair of oppositely projecting terminals, the fixture can be inverted for subsequent coating of the opposite terminals. In either case, the fixture including at least the channel members are formed from a selected material to which the solder bath will not adhere, such as a titanium alloy or the like.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view illustrating a solder dip station including an improved solder dip fixture embodying the novel features of the invention;

FIG. 2 is an enlarged exploded perspective view depicting one preferred fixture construction;

FIG. 3 is a fragmented perspective view illustrating alternative components and component spacing with use of the fixture; and FIG. 4 is a fragmented perspective view showing still other alternative components and component spacing with use of the fixture.

DETAILED DESCRIPTION OF THE PREFERRED EMBODIMENT

As shown in the exemplary drawings, an improved fixture referred to generally in FIGS. 1 and 2 by the reference numeral 10 is provided for supporting a plurality of small components such as electrical or electronic components 12 during manufacturing processes. The fixture 10 is particularly designed to support such components of various sizes and shapes during production processes such as solder dip coating of conductive terminals 14 (FIG. 2) on the components, by means of a solder dip station 16 as viewed generally in FIG. 1.

More particularly, with reference to FIG. 1, the improved fixture 10 of the present invention is designed primarily for use with the solder dip station 16 having a machine base 18 defining a basin 20 containing a heated bath 22 of an appropriate conductive solder material In addition, the dip station 16 typically includes an auxiliary basin 24 within which is disposed a suitable solvent 26 for rinsing the components 12 prior to solder dip coating, all in a manner generally known to those skilled in the art. A mobile transfer head 28 on the dip station 16 is provided to support the improved fixture 10 during transfer back and forth for appropriate dipping into the solvent 26 and the solder bath 22, as will be described in more detail. Alternately, it will be understood that the improved fixture 10 may be utilized with other types of processing equipment to support a group of small components during production process steps.

In general terms, the improved fixture 10 is designed for relatively rapid and easy assembly concurrently with relatively easy loading with a large number of the small components 12 to be processed. With electrical or electronic components such as transistors, resistors, and other solid state devices of various types and shapes, the fixture 10 provides a substantially universal fixture for supporting and carrying components of different sizes and shapes without requiring multiple fixtures of unique design for each component to be processed. The fixture 10 fits quickly and easily into the mobile transfer head 28 of the solder dip station 16 and supports the components in a secure and stable manner for accurate batch processing.

The improved fixture 10 is shown best in FIG. 2 to include a generally U-shaped frame 30 having a lower support bar 32 connected between the lower ends of a pair of generally parallel end posts 34. While the form of the connection may vary, FIG. 2 illustrates a pair of elongated screws 36 passed upwardly through the opposite ends of the support bar 32 and further longitudinally through the end posts 34 to project a short distance above the respective end posts. The outboard ends of the support bar 32 and the end posts 34 cooperatively define a pair of elongated grooves 38 for smooth slide fit mounting of the fixture, when assembled into the mobile head 28 of the dip station 16, as will be further described.

A plurality of individual channel members 40 are designed to stack one on top of the other upon the lower support bar 32, and in nested relation extending between the frame end posts 34. More particularly, each channel member 40 has a generally U-shaped cross section defined by a base wall 42 joined along opposite side margins to a pair of short upstanding side walls 44. The base wall 42 has a length chosen to fit between the end posts 34 and a width generally corresponding with the widths of the end posts 34 and the lower support bar 32. Moreover, as shown clearly in FIG. 2, each base wall 42 has a spaced plurality of apertures 46 formed therein.

The side walls 44 for each channel member 40 extend at least a short distance beyond the opposite ends of the associated base wall 42. Accordingly, the side walls 44 include short extension flaps 48 at the opposite ends thereof, wherein these extension flaps 48 are positioned to lie against the outboard sides of the end posts 34 when the channel member 40 is installed into the fixture frame 30. Importantly, the two side walls 44 of each channel member 40 include arrays of upwardly open slots 50 formed in constant or variable spacing, as desired, and in general alignment with a matched slot in the opposite side wall of the channel member.

The channel members 40 are loaded into the fixture frame 30 one at a time each with its base wall 42 presented downwardly toward the lower support bar 32. This exposes the side wall slots 50 in the channel member 40 for easy loading of the plurality of the components 12 into the channel member. In this regard, each aligned pair of the slots 50 in each channel member 40 may carry a component 12 such as a resistor (FIG. 2) having a body disposed between the side walls 44 and conductive terminals 14 extending outwardly from both sides of the fixture through the side wall slots 50. Alternately, as viewed in FIG. 3, components 12' of different sizes can be loaded into every other aligned slot pair. Still further, as viewed in FIG. 4, components 12" of different size and shape and having individual pairs of terminals 14" can be loaded into the same channel members. When a channel member 40 is loaded as desired with the selected components, the next channel member in sequence is loaded into the frame 30 and similarly loaded with the components to be processed. These loading steps are accomplished quickly and easily with the frame 30 oriented in an upright position, namely, with the end posts 34 projecting upwardly from the lower support bar 32.

When the final channel member 40 is loaded into the frame 30, a gate strip 52 is placed across the uppermost channel member to loosely retain in place the components loaded into that channel member. This gate strip 52 bridges the tops of the frame end posts 34 and includes notches 54 adapted to receive the exposed upper ends of the screws 36. Wing nuts 56 are then fastened quickly and easily onto the screws 36 to hold the gate 52 in place. Apertures 58 are also conveniently formed in the gate strip 52, and a cushion strip 60 of selected foam material or the like may be provided between the gate strip and the underlying loaded components, if desired.

The loaded and assembled fixture 10 is turned on its side for slide fit mounting onto the mobile transfer head 28 (FIG. 1) for component processing. In this regard, the head 28 conveniently includes a pair of support arms 62 (FIG. 2) with inturned flanges 64 adapted to slide fit into the outboard grooves 38 in the fixture 10. The transfer head 28 can then be operated to dip the fixture 10 and the components carried thereby into the solvent 26 for initial rinsing. During this step, it may be desirable to immerse the entire fixture and components, whereby the apertures 46 and 58 in the channel members 40 and the gate strip 52 permit relatively free drainage. The head 28 is then manipulated to dip a selected length of the component terminals 14 into the solder bath 22 for dip coating the terminals.

After this dip coating step, the fixture 10 can be inverted for subsequent dip coating of opposite terminals, as required. Importantly, however, the component bodies tend to fall by gravity relatively freely to rest upon the lowermost side walls 44 of the associated channel members 40, thereby exposing a maximum portion of the associated terminals for solder coating. Moreover, at least the channel members 40 are beneficially formed from a selected material such as a titanium alloy to which the solder material will not adhere, although other materials having selected thermal insulating properties may be desired in some applications. In any event, after dip coating, the fixture 10 is removed quickly and easily from the transfer head 28 and disassembled for easy unloading and subsequent reloading with new components to be processed.

The improved fixture 10 of the present invention thus provides a relatively simple yet versatile structure for supporting a group of small electrical components or the like during solder dip or similar processes. The fixture is loaded quickly and easily with components of various size and shape, as required, with enhanced versatility being provided by use of channel members with different slot array configurations.

A variety of further modifications and improvements to the invention will be apparent to those skilled in the art. Accordingly, no limitation on the invention is intended by way of the description herein and the accompanying drawings, except by way of the appended claims.

What is claimed is:

1. A solder dip fixture for use in supporting a plurality of components such as electrical components during solder dip processing or the like, said fixture comprising:
    a generally U-shaped frame;
    a plurality of channel members each having a generally U-shaped cross section defined by a base wall joined between a pair of spaced side walls, said pair of spaced side walls having a plurality of slots formed therein in aligned pairs for supporting at least one of the components to be processed, said channel members being adapted for loading into said frame with the side walls of adjacent channel members in stacked relation and with said base walls of said channel members in spaced relation; and
    means for retaining said channel members loaded into said frame and to loosely retain said components loaded into said channel members when said fixture is inverted.

2. The fixture of claim 1 wherein each of said channel members includes means for sliding fit mounting into said frame with said plurality of channel members in stacked relation, said retaining means comprising a gate strip removably mounted on said frame for preventing sliding removal of said channel members from said frame.

3. The fixture of claim 1 wherein said base wall of each of said channel members is oriented generally perpendicular to said side walls, said base wall having at least one aperture formed therein.

4. The fixture of claim 1 wherein said frame comprises a lower support bar connected at its opposite ends to the lower ends of a pair of generally parallel end posts, each of said channel members having a generally U-shaped cross section defined by a base wall having a length for slide fit reception between said end posts and said pair of side walls having extension flaps at the opposite ends thereof protruding at least slightly beyond the associated ends of said base wall, said extension flaps engaging outboard side margins of said end posts when said channel member is installed with said base wall extending between said end posts.

5. The fixture of claim 4 wherein said retaining means comprises a gate strip connected between the upper ends of said end posts.

6. The fixture of claim 5 wherein said gate strip has a plurality of apertures formed therein.

7. The fixture of claim 5 further including a cushion strip disposed between said gate strip and the channel member adjacent thereto.

8. The fixture of claim 5 wherein said end posts have a respective pair of screws projecting from the upper ends thereof, said gate strip having openings therein for receiving said screws, and a pair of wing nuts for threading onto said screws for removably retaining said gate strip on the upper ends of said end posts.

9. The fixture of claim 1 wherein the channel members are formed from titanium.

10. The fixture of claim 4 wherein said end posts have elongated grooves formed in the outboard ends thereof.

11. A fixture for use in supporting a plurality of components, such as electrical components each having a body with at least one outwardly projecting terminal, during solder dip processing or the like, said fixture comprising:
    a generally U-shaped frame including a lower support bar having its opposite ends connected between the lower ends of a generally parallel pair of end posts;
    a plurality of channel members each having a generally U-shaped cross section defined by a base wall having a length for slid fit reception between said end posts and a pair of side walls with extension flaps at the opposite ends thereof protruding at least slightly beyond the associated ends of said base wall, said extension flaps engaging outboard side margins of said end posts when said channel member is installed with said base wall extending between said end posts, said channel members being receivable one at a time onto said lower support bar to extend between said end posts with said side walls in stacked relation, at least one of said side walls having a plurality of slots formed therein to permit the components to be mounted into said channel member with the component body between said side walls and the terminal projecting outwardly therefrom through a selected one of said slots; and
    a gate strip connected between the upper ends of said end posts to retain said channel members in stacked relation between said end posts.

12. The fixture of claim 11 wherein said side walls for each of said channel members have a plurality of slots formed therein in aligned pairs.

13. The fixture of claim 11 wherein said base wall of each of said channel members has a plurality of apertures formed therein.

14. The fixture of claim 11 wherein said gate strip has a plurality of apertures formed therein.

15. The fixture of claim 11 further including a cushion strip disposed between said gate strip and the channel member adjacent thereto.

16. The fixture of claim 11 wherein said channel members are formed from titanium.

17. The fixture of claim 11 wherein said end posts have elongated grooves formed in the outboard ends thereof, and further including a solder dip station having a transfer head with flange means for slide fit reception into said end post grooves.

18. A solder dip fixture for use in supporting a plurality of components such as electrical components during solder dip processing or the like, said fixture comprising:
    a generally U-shaped frame;
    a plurality of channel members each having a generally U-shaped cross section defined by a base wall joined between and oriented generally perpendicularly to a spaced pair of side walls, said side walls for each of said channel members defining a plurality of slots formed in generally aligned pairs;
    said channel members being mounted into said frame one on top of the other with said side walls of said channel members in stacked relation and with said base walls of said channel members in spaced relation; and
    means for retaining said channel members loaded in stacked relation in said frame and to loosely retain said components loaded into said channel members when said fixture is inverted;
    said base wall of each of said channel members having at least one drain aperture formed therein.

* * * * *